(12) United States Patent
Terashima

(10) Patent No.: US 11,554,806 B2
(45) Date of Patent: Jan. 17, 2023

(54) STEERING DEVICE

(71) Applicant: HITACHI AUTOMOTIVE SYSTEMS, LTD., Hitachinaka (JP)

(72) Inventor: Kazuya Terashima, Isehara (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 253 days.

(21) Appl. No.: 16/964,296

(22) PCT Filed: Jan. 28, 2019

(86) PCT No.: PCT/JP2019/002713
§ 371 (c)(1),
(2) Date: Jul. 23, 2020

(87) PCT Pub. No.: WO2019/163430
PCT Pub. Date: Aug. 29, 2019

(65) Prior Publication Data
US 2021/0031829 A1   Feb. 4, 2021

(30) Foreign Application Priority Data
Feb. 23, 2018   (JP) .............................. JP2018-030547

(51) Int. Cl.
*B62D 5/04* (2006.01)
*F16H 25/20* (2006.01)
*F16H 25/22* (2006.01)
*F16H 25/24* (2006.01)

(52) U.S. Cl.
CPC ............. *B62D 5/0403* (2013.01); *B62D 5/04* (2013.01); *B62D 5/0424* (2013.01); *B62D 5/0448* (2013.01); *F16H 25/2009* (2013.01); *F16H 25/2204* (2013.01); *F16H 25/24* (2013.01); *F16H 2025/2031* (2013.01); *F16H 2025/2081* (2013.01)

(58) Field of Classification Search
CPC ........................... B62D 5/0424; B62D 5/0448
USPC .......................................................... 180/444
See application file for complete search history.

(56) References Cited

FOREIGN PATENT DOCUMENTS

| DE | 102019209930 A1 * | 1/2021 | .......... B62D 5/0448 |
|---|---|---|---|
| JP | S62-127867 U | 8/1987 | |
| JP | H08-216899 A | 8/1996 | |
| JP | H08216899 A * | 8/1996 | |
| JP | H10-058081 A | 3/1998 | |

(Continued)

OTHER PUBLICATIONS

International Search Report issued in corresponding application No. PCT/JP2019/002713 dated Mar. 19, 2019 with English translation.

(Continued)

*Primary Examiner* — Kevin Hurley
*Assistant Examiner* — Hosam Shabara
(74) *Attorney, Agent, or Firm* — Foley & Lardner LLP

(57) ABSTRACT

A steering device of the present invention has a steered shaft rotation stopper (100) having a contact member (101) and a forcing member (102). The forcing member (102) forces at least either one of a steered shaft (6) or the contact member (101) in a direction in which the steered shaft (6) and the contact member (101) push against each other. In a state in which the contact member (101) contacts a contact portion (6D) of the steered shaft (6), the contact member (101) stops a rotation of the steered shaft (6).

24 Claims, 15 Drawing Sheets

(56) References Cited

FOREIGN PATENT DOCUMENTS

| | | | | |
|---|---|---|---|---|
| JP | H1058081 | A | * | 3/1998 |
| JP | 2004-189038 | A | | 7/2004 |
| JP | 2004189038 | A | * | 7/2004 |
| JP | 2006-168579 | A | | 6/2006 |
| JP | 2006168579 | A | * | 6/2006 |
| JP | 2011-025873 | A | | 2/2011 |
| JP | 2011025873 | A | * | 2/2011 |
| JP | 2012-066788 | A | | 4/2012 |
| JP | 2012066788 | A | * | 4/2012 |
| JP | 2012-215614 | A | | 11/2012 |
| JP | 2013-036576 | A | | 2/2013 |
| JP | 2013036576 | A | * | 2/2013 |
| JP | 2015-003649 | A | | 1/2015 |

OTHER PUBLICATIONS

Written Opinion issued in corresponding application No. PCT/JP2019/002713 dated Mar. 19, 2019 with English translation.

* cited by examiner

FIG. 11
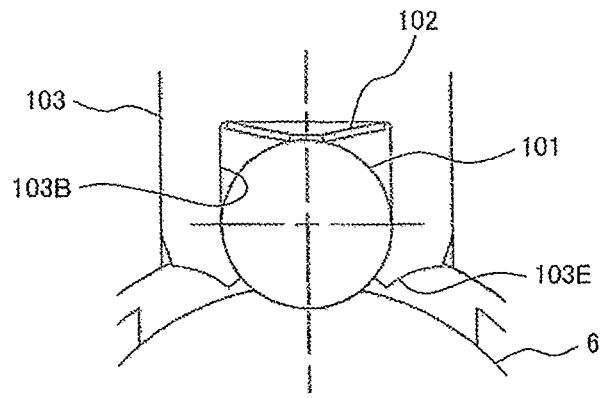
FIG. 12
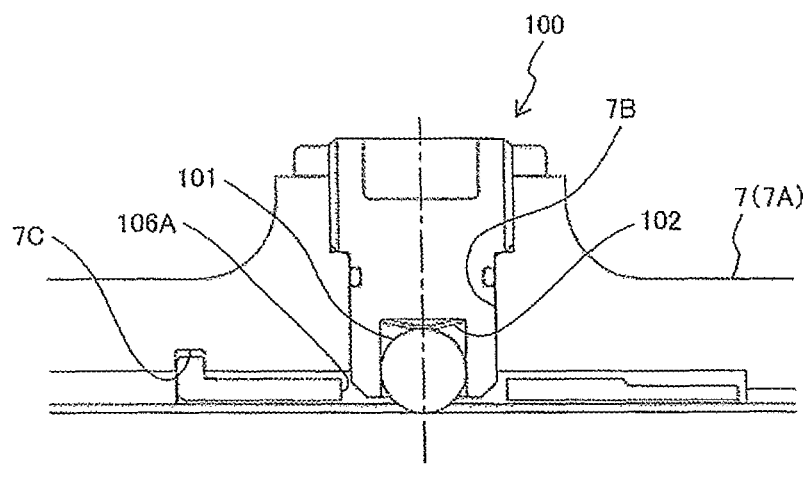
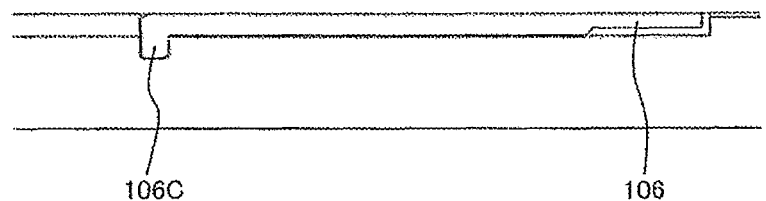

STEERING DEVICE

TECHNICAL FIELD

The present invention relates to a steering device whose steered shaft can be moved by an actuator.

BACKGROUND ART

As a background art in this technical field, there is known a steering device disclosed in JP2012-066788 (Patent Document 1). In Patent Document 1, a steered shaft supporting structure of the steering device has a versatile cylindrical bush press-fitted into an inner peripheral surface of a housing and a single-piece unit (par. 0027). The single-piece unit is formed such that a D-shaped cross section member having a cylindrical surface and a flat surface and a ring-shaped member are fixedly connected together (par. 0029). The D-shaped cross section member is inserted into the cylindrical bush, and supports a steered shaft slidably in an axial direction and also stops rotation of the steered shaft in combination with the cylindrical bush (par. 0031).

CITATION LIST

Patent Document

Patent Document 1: Japanese Unexamined Patent Application Publication No. 2012-066788

SUMMARY OF THE INVENTION

Technical Problem

In the Patent Document 1, however, the D-shaped cross section member of the steering device is provided such that the D-shaped cross section member is inserted into the cylindrical bush and slides with the steered shaft. Due to tolerances of machining of parts and clearances at assembly, a gap could exist between the D-shaped cross section member and the steered shaft. Further, due to a long-use, wear could occur at the D-shaped cross section member and/or the steered shaft. As a consequence of the wear of the D-shaped cross section member and/or the steered shaft, there is a possibility that a gap will appear between the D-shaped cross section member and the steered shaft and that the gap will widen.

The gap appearing between the steered shaft and the D-shaped cross section member (a contact member) that contacts or is contiguous with the steered shaft causes wobbly shakes (backlash) between the steered shaft and the contact member.

An object of the present invention is therefore to provide a steering device that is capable of suppressing the wobbly shakes (the backlash) occurring between the steered shaft and the contact member.

Solution to Problem

According to the present invention, the steering device has the following configuration.

A steering device of the present invention has a steered shaft rotation stopper having a contact member and a forcing member. The forcing member forces at least either one of a steered shaft or the contact member in a direction in which the steered shaft and the contact member push against each other. In a state in which the contact member contacts a contact portion of the steered shaft, the contact member stops a rotation of the steered shaft.

Effects of Invention

According to the present invention, it is possible to suppress the wobbly shakes (the backlash) occurring between the steered shaft and the contact member.

BRIEF DESCRIPTION OF THE DRAWINGS

FIG. 11 is a sectional view showing a modified example in which a structure of the contact member retainer 103 is modified.

FIG. 12 is a drawing showing a modified example in which a part of a configuration of a steered shaft supporting member 106 is modified.

EMBODIMENTS FOR CARRYING OUT THE INVENTION

An embodiment of a steering device according to the present invention will be explained below with reference to the drawings.

Figure 1:
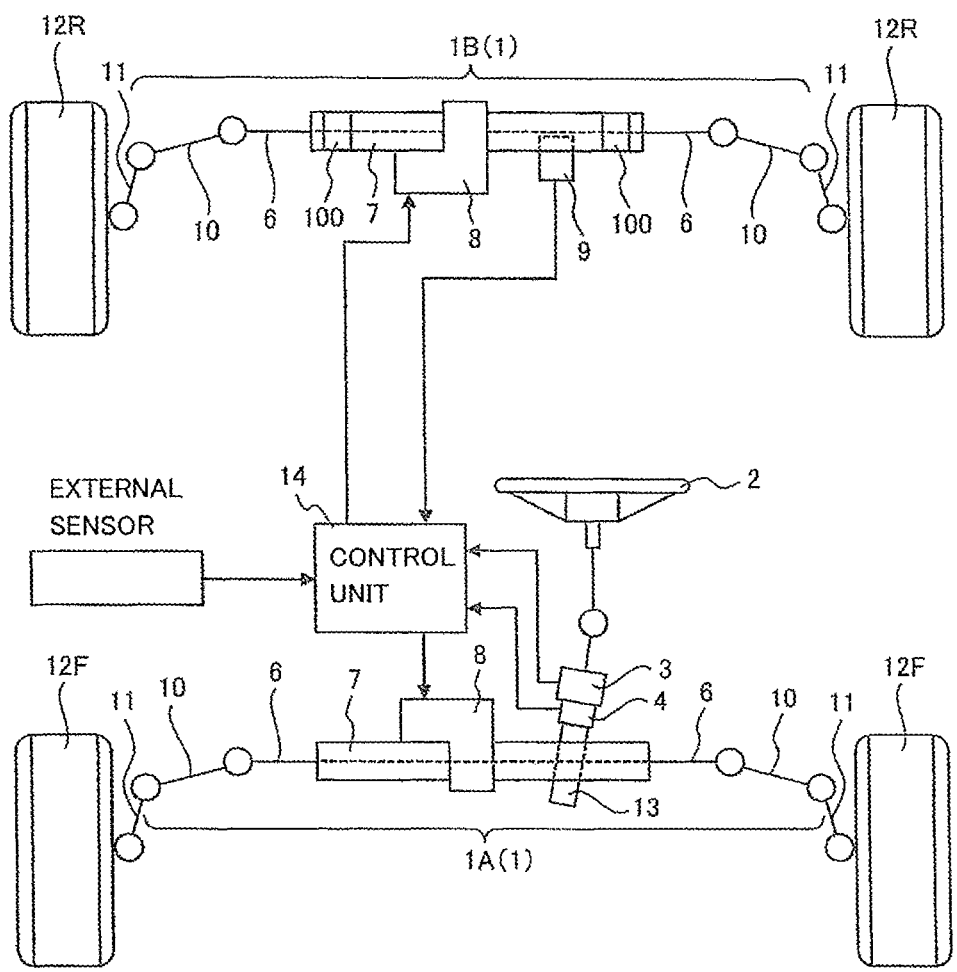
FIG. 1 is a schematic diagram of a steering system according to an embodiment of the present invention.

A steering system employing the steering device of the present invention will be explained with reference to FIG. 1. FIG. 1 is a schematic diagram of the steering system according to an embodiment of the present invention.

A steering device 1A and a steering device 1B have the same configuration except for a steering mechanism 13, a steered shaft rotation stopper 100 and a steered shaft displacement sensor 9. A component part common to the steering device 1A and the steering device 1B is denoted by the same reference sign.

The steering device 1 (1A, 1B) has a rod-shaped steered shaft 6, a steered shaft housing 7 that accommodates therein the steered shaft 6 and a steered shaft drive unit 8 that drives the steered shaft 6. Tie rods 10 are linked to both ends of the steered shaft 6, knuckle arms 11 are linked to the tie rods 10 respectively, and wheels 12F and 12R are supported by these knuckle arms 11. A linear motion of the steered shaft 6 along its longitudinal direction is converted into a steering motion (or a turning motion) of the wheels 12F and 12R through the tie rods 10 and the knuckle arms 11. It is noted that the tie rods 10 or both of the tie rods 10 and the knuckle arms 11 could be included as a component part of the steering device 1.

The steering device 1 of the present embodiment transmits a driving force of an electric motor 8A to the steered shaft 6 through the steered shaft drive unit (a screw mechanism) 8. The steering device 1A is a steering device that steers the front wheels 12F, and the steering device 1B is a steering device that steers the rear wheels 12R.

The steering device 1 has the front wheel-side steering device 1A for steering the front wheels 12F and the rear wheel-side steering device 1B for steering the rear wheels 12R. Here, it is conceivable that the steering device 1A is configured to steer the rear wheels 12R and the steering device 1B is configured to steer the front wheels 12F depending on vehicles. That is, configuration or arrangement of the steering device 1A and the steering device 1B is not limited to that of the present embodiment.

The steering device 1A is provided with a steering mechanism (a manual steering gear) 13, and rotation of a steering wheel 2 by driver's steering operation is transmitted to the steered shaft 6 through the steering mechanism 13. The steering mechanism 13 has a pinion (not shown), and the pinion is engaged with a rack (not shown) formed on an outer periphery of the steered shaft 6.

The steering mechanism (the manual steering gear) 13 is provided with a steering angle sensor 3 and a steering torque sensor 4. The steering angle sensor 3 and the steering torque sensor 4 detect steering angle information and steering torque information of the steering wheel 2 turned by the driver's operation. These steering angle information and steering torque information are inputted to a control unit 14. The control unit 14 controls the steered shaft drive unit 8 of the steering device 1A on the basis of the steering angle information and the steering torque information. The steered shaft drive unit 8 of the steering device 1A forms an assist mechanism that assists a driving force of the steered shaft 6.

Here, by performing drive control of the steered shaft drive unit 8 of the steering device 1A without driver's steering operation, an automatic operation can also be carried out.

The steering device 1B is not provided with the steering mechanism 13. The steered shaft drive unit 8 of the steering device 1B is driven and controlled by the control unit 14, then the steered shaft 6 of the steering device 1B is driven. The steering device 1B is provided with the steered shaft displacement sensor 9. The control unit 14 gets displacement information of the steered shaft 6 obtained by the steered shaft displacement sensor 9, and moves the steered shaft 6. In this regard, the control unit 14 could control the steered shaft drive unit 8 of the steering device 1B according to the steering angle information and the steering torque information, or may control the steered shaft drive unit 8 of the steering device 1B irrespective of the steering angle information and the steering torque information.

The steering device 1B can be used, for instance, as a steering device for rear wheels of a four-wheel-steering vehicle. Further, it is conceivable that a complete automatic steering operation is performed by using the steering device 1B to steer the wheels of a vehicle in which either one of the front wheels or the rear wheels are steered.

The steered shaft 6 of the steering device 1A can move in the longitudinal direction (a direction along an axial line 6A) of the steered shaft 6 when driven by the steered shaft drive unit 8 by the fact that rotation is stopped by the steering mechanism 13. On the other hand, since the steering device 1B is not provided with the steering mechanism 13, in order to stop rotation of the steered shaft 6, the steered shaft rotation stopper 100 is provided.

Figure 2:
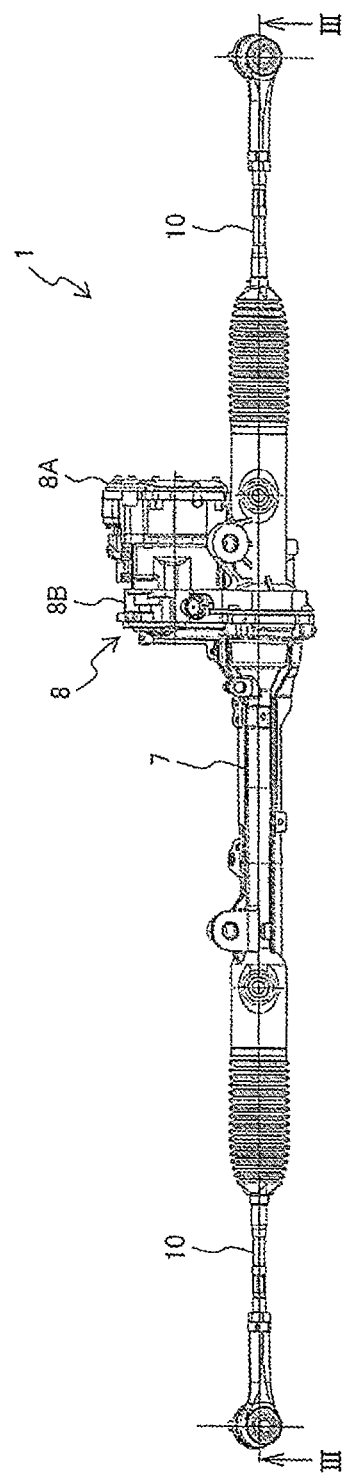
FIG. 2 is a plan view showing an outward appearance of a steering device 1B shown in FIG. 1.
Figure 3:
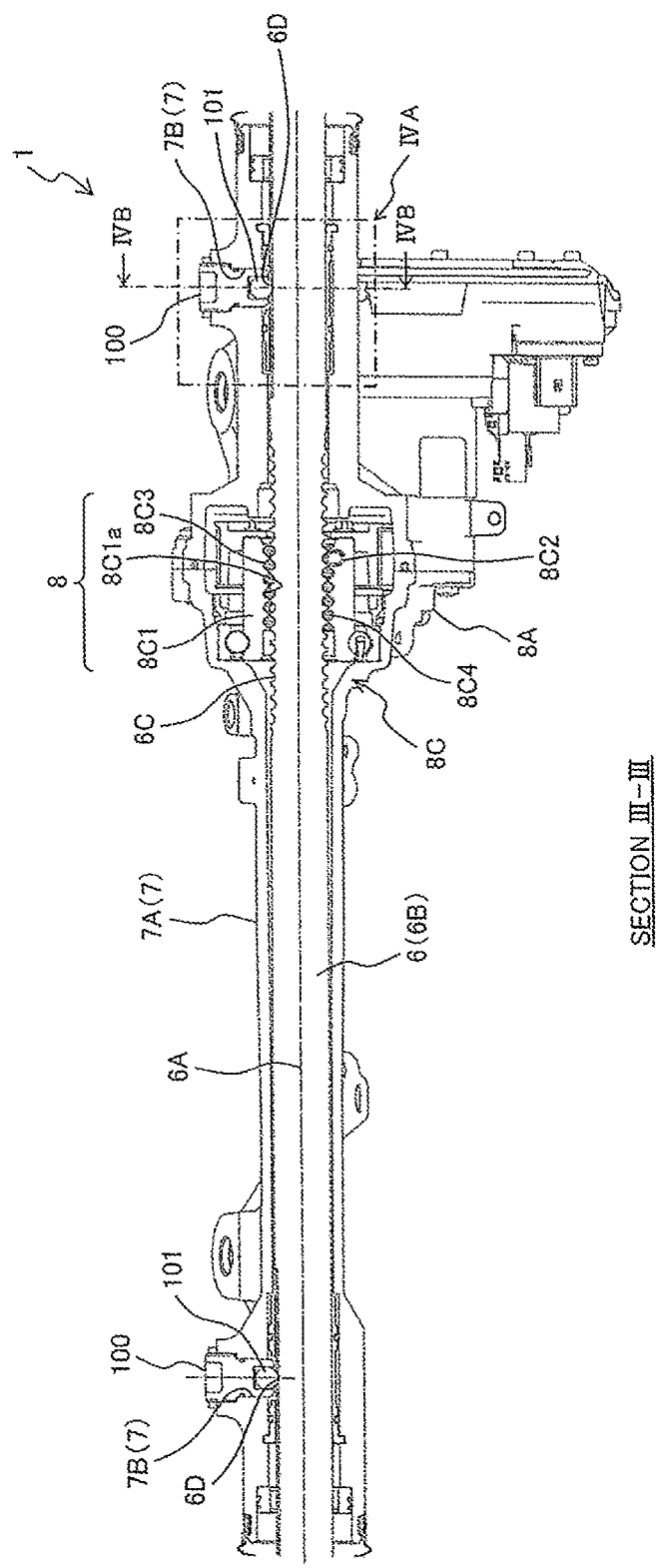
FIG. 3 is a local sectional view of the steering device 1 shown in FIG. 2, taken along a plane III-III of FIG. 2.

Next, a configuration of the steering device 1B will be explained in detail with reference to FIGS. 2 and 3. FIG. 2 is a plan view showing an outward appearance of the steering device 1B shown in FIG. 1. FIG. 3 is a local sectional view of the steering device 1 shown in FIG. 2, taken along a plane of FIG. 2.

In the following explanation, except in a case of necessity, the steering device 1A and the steering device 1B are called the steering device 1 without differentiating between the steering device 1A and the steering device 1B.

The steered shaft 6 is a member that linearly moves along the longitudinal direction (the direction along an axial line 6A) of the steered shaft 6 and steers the wheels 12F and 12R by and according to the movement by the linear motion.

Here, a reference axial line is defined, and this reference axial line is used in the following explanation. The reference axial line is identical to the axial line 6A. That is, the reference axial line 6A is an axial line that passes through a center of a main body (a steered shaft main body) 6B of the steered shaft 6 on a cross section orthogonal to the longitudinal direction of the steered shaft 6 and that is parallel to the longitudinal direction of the steered shaft 6.

The steered shaft housing 7 is an accommodation member that accommodates therein the steered shaft 6. The steered shaft housing 7 accommodates at least a part of the steered shaft 6. The steered shaft housing 7 has a tubular shape having a hollow portion that is formed along the axial line 6A. The steered shaft 6 is inserted in an inner peripheral side of the steered shaft housing 7. That is, the steered shaft housing 7 has a steered shaft accommodating section 7A where a part of the steered shaft 6 is accommodated.

As mentioned above, the steering device 1B is provided with the steered shaft rotation stopper 100 to stop (restrain) the rotation of the steered shaft 6, and the steered shaft housing 7 has a steered shaft rotation stopper holder 7B that holds the steered shaft rotation stopper 100. In the present embodiment, the steered shaft rotation stopper holder 7B is provided at the steered shaft accommodating section 7A. The steered shaft rotation stopper holder 7B is formed as a penetration hole that penetrates the steered shaft housing 7 from an outer peripheral side to the inner peripheral side of the steered shaft housing 7.

The steered shaft drive unit 8 has the electric motor 8A, a speed reducer 8B that increases torque of the electric motor 8A and a ball screw mechanism 8C that transmits an output of the electric motor 8A to the steered shaft 6. The steered shaft drive unit 8 is controlled by the control unit 14, and linearly moves the steered shaft 6 in the longitudinal direction. The electric motor 8A forms an electric actuator that linearly moves the steered shaft 6. Rotation of the electric motor 8A is transmitted to a nut 8C1 of the ball screw mechanism 8C through the speed reducer 8B and a belt (not shown).

The ball screw mechanism 8C has the nut 8C1, the steered shaft 6, a ball circulation passage 8C2 and a plurality of balls 8C3. The nut 8C1 is formed into an annular shape so as to surround the steered shaft 6. The nut 8C1 is provided such that the nut 8C1 is rotatable relative to the steered shaft 6. The nut 8C1 has, at an inner periphery thereof, a spiral screw groove 8C1a. The main body (the steered shaft main body) 6B of the steered shaft 6 has, at an outer periphery thereof, a spiral screw groove section 6C. The screw groove section 6C is formed at a position that is separate, in the direction along the reference axial line 6A, from a section where the rack (not shown) meshing with the pinion of the steering mechanism 13 is formed.

In a state in which the steered shaft 6 is inserted in the nut 8C1, a ball circulation groove 8C4 is formed by the screw groove 8C1a of the nut 8C1 and the screw groove section 6C of the steered shaft 6, and the ball circulation groove 8C4 is filled with the balls 8C3. A rotation force of the electric motor 8A is transmitted to the nut 8C1 by a rotation force transmission device including the speed reducer 8B and the belt (not shown) etc. The nut 8C1 is then driven and rotates by the rotation force of the electric motor 8A. When the nut 8C1 rotates, the balls 8C3 move in the ball circulation groove 8C4, and thus the steered shaft 6 moves with respect to the nut 8C1 in the longitudinal direction (the direction along the reference axial line 6A). The ball 8C3 reaching one end of the nut 8C1 is returned to the other end of the nut 8C1 through the ball circulation passage 8C2.

In the present embodiment, the steering device 1B is provided with the steered shaft rotation stopper 100 to stop the rotation of the steered shaft 6. Because of this, the main body 6B of the steered shaft 6 is provided with a contact portion 6D which a contact member 101 provided at the steered shaft rotation stopper 100 contacts or is contiguous with. The contact portion 6D is located at an outer peripheral side (an outer peripheral surface) of the steered shaft main body 6B, more specifically, at a position corresponding to the steered shaft rotation stopper holder 7B holding the steered shaft rotation stopper 100. In the present embodiment, the steered shaft rotation stopper holder 7B and the contact portion 6D are provided at both end portions of the steered shaft 6 (the main body 6B), and located at different positions from the groove section 6C in the direction along the reference axial line 6A.

The steering device 1 explained above has the steered shaft housing 7, the steered shaft 6 and the actuator (the steered shaft drive unit) 8. The steered shaft housing 7 has the steered shaft accommodating section 7A and the steered shaft rotation stopper holder 7B. The steered shaft accommodating section 7A is tubular in shape. The steered shaft 6 has the steered shaft main body 6B and the contact portion 6D. At least a part of the steered shaft 6 is accommodated in the steered shaft accommodating section 7A. The steered shaft main body 6B has the rod-shape. The contact portion 6D is provided at the outer peripheral side of the steered shaft main body 6B. The actuator 8 can move the steered shaft 6 with respect to the steered shaft housing 7 in the longitudinal direction of the steered shaft 6.

In the following, an embodiment of the steered shaft rotation stopper that stops (restrains) the rotation of the steered shaft 6 will be explained.

Embodiment 1

Figure 4A:
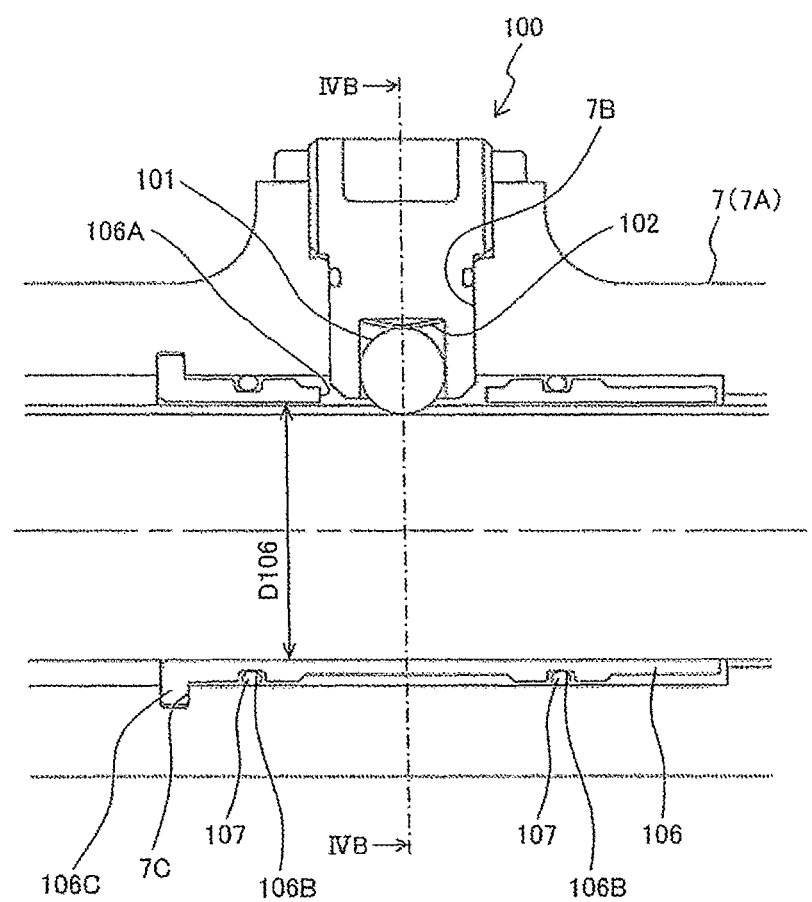
FIG. 4A is an enlarged sectional view of an area IVA of FIG. 3.
Figure 4B:
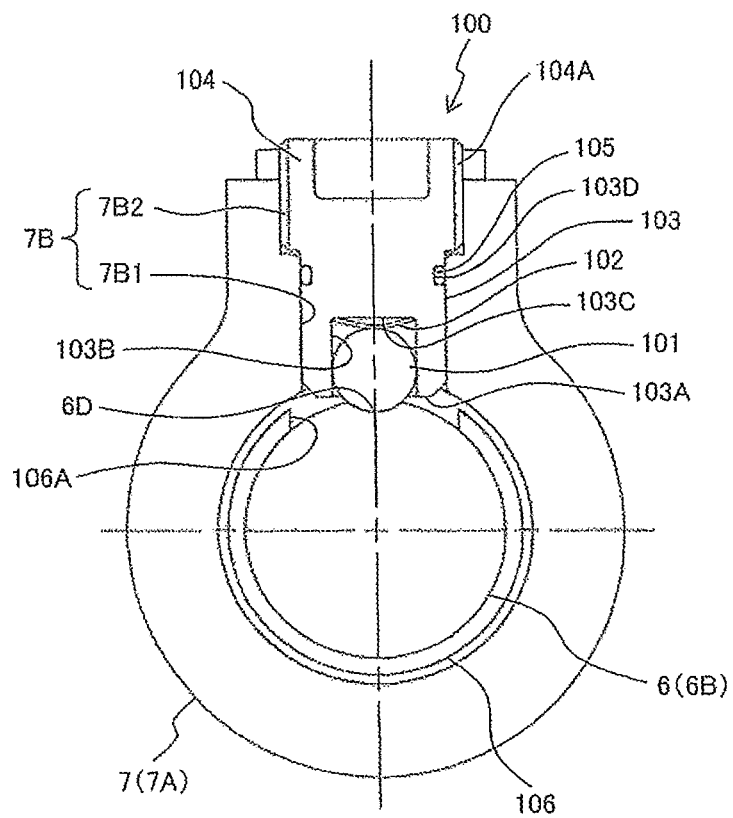
FIG. 4B is a sectional view taken along a plane IVB-IVB of FIG. 3.

An embodiment of the steered shaft rotation stopper will be explained with reference to FIGS. 4A and 4B. FIG. 4A is an enlarged sectional view of an area IVA of FIG. 3. FIG. 4B is a sectional view taken along a plane IVB-IVB of FIG. 3. Here, FIG. 4A depicts a state in which right and left are reversed with respect to FIG. 3. The sectional view of FIG. 4B corresponds to an entire cross section taken along a plane IVB-IVB of FIG. 4A.

The steered shaft rotation stopper of the present embodiment is formed by the steered shaft rotation stopper 100. The steered shaft rotation stopper 100 has the contact member 101, a forcing member 102, a contact member retainer (a contact member retaining unit) 103 and a spring stroke adjuster (a spring stroke adjusting unit) 104. That is, the steered shaft rotation stopper 100 is formed by a plurality of members.

The contact member 101 is provided so as to be able to contact the contact portion 6D of the steered shaft 6. In a state in which the contact member 101 contacts the contact portion 6D, the contact member 101 stops (restrains) a rotation of the steered shaft 6 relative to the steered shaft housing 7 about the reference axial line 6A as an axis of the rotation. The contact member 101 is provided such that the contact member 101 can rotate (roll) with respect to the steered shaft 6. Since the contact member 101 can rotate (roll) with respect to the steered shaft 6, a sliding resistance between the steered shaft 6 and the contact member 101 can be reduced. Therefore, in the present embodiment, the contact member 101 is formed into a spherical shape such that the contact member 101 can rotate (roll) on the steered shaft 6. That is, the contact member 101 is formed by a spherical member.

On the other hand, the contact portion 6D is provided on the outer peripheral surface of the steered shaft 6. The contact portion 6D has a concave or depressed shape that opens outwards in a radial direction with the reference axial line 6A being a center of the radial direction. Further, the contact portion 6D is formed so as to extend along the direction of the reference axial line 6A. In the present embodiment, the contact portion 6D has, in cross section orthogonal to the reference axial line 6A, an arc shape along a spherical surface of the contact member 101. Then, the contact member 101 contacting the contact portion 6D comes into an inside of the concave shape of the contact portion 6D so as to get closer to the reference axial line 6A with respect to the cylindrical outer peripheral surface of the steered shaft 6.

Figure 5:
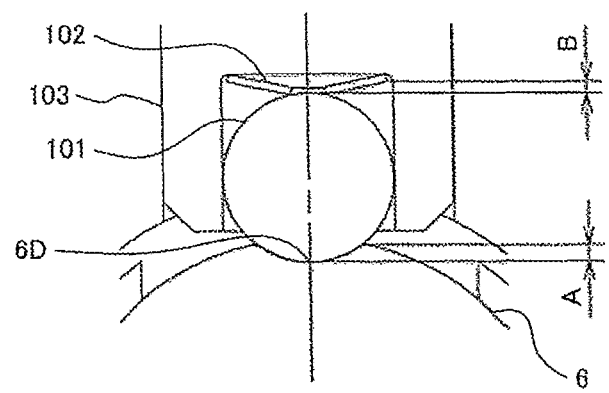
FIG. 5 is a drawing showing a relationship between a stroke B of a forcing member 102 and a fitting depth (an overlap amount) A of a contact member 101 and a contact portion 6D.

Here, a stroke of the forcing member 102 will be explained with reference to FIG. 5. FIG. 5 is a drawing showing a relationship between a stroke B of the forcing member 102 and a fitting depth (an overlap amount) A of the contact member 101 and the contact portion 6D.

The contact member 101 is fitted into the contact portion 6D such that the contact member 101 and the contact portion 6D overlap each other in the radial direction with the reference axial line 6A being the center of the radial direction. The overlap amount (length or depth) A between the contact member 101 and the contact portion 6D is greater than the stroke B of the forcing member 102 (A>B). That is the contact member 101 and the contact portion 6D are set so as to overlap each other in the radial direction with the reference axial line 6A being the center of the radial direction such that their overlap amount is greater than a stroke length (a length from compression to expansion) of the forcing member 102. As a result, even in a case where the forcing member 102 is compressed to the maximum, fitting or engagement of the contact member 101 and the contact portion 6D is maintained, thereby suppressing fall-off of the contact member 101 from the contact portion 6D.

Figure 6A:
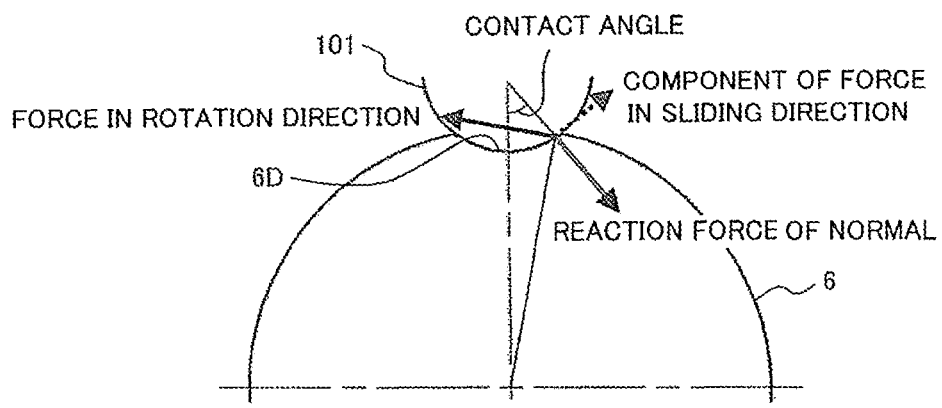
FIG. 6A is a conceptual drawing showing a contact state of the contact portion 6D of a steered shaft 6 and the contact member 101, according to an embodiment of the present invention.
Figure 6B:
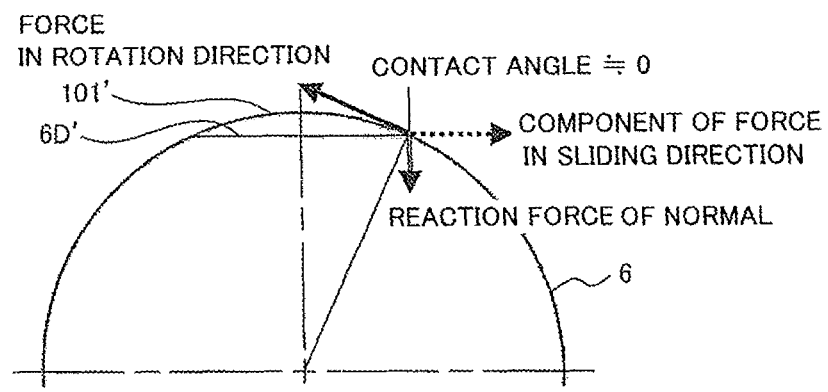
FIG. 6B is a conceptual drawing showing a contact state of a contact portion 6D' of a steered shaft 6' and a contact member 101', according to a comparative example.

Here, an effect of stopping rotation of the contact portion 6D will be explained with reference to FIGS. 6A and 6B. FIG. 6A is a conceptual drawing showing a contact state of the contact portion 6D of the steered shaft 6 and the contact member 101, according to the embodiment of the present invention. FIG. 6B is a conceptual drawing showing a contact state of a contact portion 6D' of a steered shaft 6' and a contact member 101', according to a comparative example.

In the comparative example, the steered shaft 6' and the contact member 101' each have a flat surface, and by contact of these flat surfaces, a movement of the steered shaft 6' in a rotation direction is stopped (restrained). In this case, as shown in FIG. 6B, a contact angle between the contact portion 6D' and the contact member 101' is approximately 0°. On the other hand, in the embodiment of the present invention, a contact angle between the contact portion 6D and the contact member 101 is greater than 0°, and thus the contact angle between the contact portion 6D and the contact member 101 can be large. Therefore, in the present embodiment, a high rotation stop effect for the steered shaft 6 can be obtained.

Returning to FIGS. 4A and 4B, the embodiment will be explained again.

The forcing member 102 is a member that forces the steered shaft 6 or the contact member 101 in a direction in which the steered shaft 6 and the contact member 101 push or press against each other. In the present embodiment, the forcing member 102 forces the contact member 101 toward the steered shaft 6. However, it is possible to force the steered shaft 6 toward the contact member 101 by the forcing member.

The forcing member 102 could be formed by a spring, and the spring is preferably made of metal. Especially in the present embodiment, the forcing member 102 is formed by a disc spring. By forming the forcing member 102 by the spring, as compared with a forcing member (an elastic member) made of rubber material, structural deterioration over time in the forcing member 102 can be suppressed. Further, since a stroke of the disc spring is shorter than that of a coil spring, separation of the contact member 101 from the contact portion 6D in a compression state of the disc spring can be suppressed. Here, the disc spring is a spring defined by FI: F16F1/32.

The forcing member 102 could be formed by the coil spring. In this case, the coil spring is preferably formed by a variable pitch spring tan irregular pitch spring). By forming the forcing member 102 by the variable pitch spring, it is possible to reduce the tendency for resonance to occur when vibrations by a mass of the contact member 101 occur.

The contact member retainer 103 is a member that retains the contact member 101. The contact member retainer 103 has, at an end surface 103A of one end thereof which faces the steered shaft 6, a hollow portion 103B that is hollow in a direction moving away from the steered shaft 6. The hollow portion 103B forms a space to accommodate and retain the contact member 101. The hollow portion 103B also accommodates therein the forcing member 102. The forcing member 102 is accommodated in the hollow portion 103B such that the forcing member 102 is interposed between a bottom surface 103C of the hollow portion 103B and the contact member 101, and forces the contact member 101 so as to push or press the contact member 101 against the steered shaft 6.

In the present embodiment, the contact member retainer (the contact member retaining unit) 103 is formed as one member together with the spring stroke adjuster (the spring stroke adjusting unit) 104. Therefore, the contact member retainer 103 has the spring stroke adjuster 104 at the other end of the contact member retainer 103 which is an opposite side to the end surface 103A where the hollow portion 103E is formed.

That is, the steered shaft rotation stopper 100 has the spring stroke adjuster 104. The spring stroke adjuster 104 is provided at the steered shaft housing 7 such that the forcing member 102 is located between the spring stroke adjuster 104 and the contact member 101 in the radial direction with the reference axial line 6A being the center of the radial direction. Further, the spring stroke adjuster 104 is provided such that a relative position of the spring stroke adjuster 104 with respect to the steered shaft housing 7 can be changed in the radial direction with the reference axial line 6A being the center of the radial direction.

Therefore, the spring stroke adjuster 104 is provided, at an outer periphery thereof, with a screw thread (a male thread) 104A. On the other hand, the steered shaft rotation stopper holder 7B is formed as the penetration hole that penetrates the steered shaft housing 7 from the outer peripheral side to the inner peripheral side of the steered shaft housing 7. Regarding this penetration hole, a part of the inner peripheral side of the steered shaft housing 7 is formed by a smooth cylindrical surface 7B1, and a part of an opening side that opens outwards is formed as a surface having a screw thread (a female thread) 7B2.

The screw thread (the male thread) 104A of the spring stroke adjuster 104 is fitted to (or screwed into) the screw thread (the female thread) 7B2 formed at the steered shaft rotation stopper holder 7B. By turning the spring stroke adjuster 104 and moving the spring stroke adjuster 104 forward or backward (protruding or retracting the spring stroke adjuster 104) toward or from the reference axial line 6A side, the stroke of the spring can be adjusted. In the present embodiment, as the spring stroke adjuster 104 moves forward to the reference axial line 6A side, the stroke of the spring becomes shorter, whereas as the spring stroke adjuster 104 moves backward with respect to the reference axial line 6A side, the stroke of the spring becomes longer.

The spring stroke adjuster 104 allows adjustment of the stroke amount and an urging force of the forcing member 102, then improves reliability of the steered shaft rotation stopper 100.

The contact member 101 is provided in the steered shaft housing 7 with the contact member 101 not being in contact with the steered shaft housing 7. Since the contact member 101 is not in contact with the steered shaft housing 7, the urging force of the forcing member 102 is not easily affected by a sliding resistance between the contact member 101 and the steered shaft housing 7 and reduction in load caused when the contact member 101 strikes against the steered shaft housing 7. This can facilitate control or set of the urging force of the forcing member 102.

The steered shaft 6 is supported by a steered shaft supporting member 106 at the steered shaft housing 7. That is, the steered shaft supporting member 106 is provided at the steered shaft accommodating section 7A, and supports the steered shaft 6 movably in the longitudinal direction. The steered shaft supporting member 106 supports the steered shaft 6 at two points in the longitudinal direction of the steered shaft 6. The steered shaft supporting member 106 restrains deformation of the steered shaft 6. In addition, the steered shaft supporting member 106 improves a supporting rigidity of the steered shaft 6.

The steered shaft supporting members 106 are arranged at positions corresponding to the steered shaft rotation stoppers 100 provided at the both end portions of the steered shaft 6. That is, the steered shaft rotation stoppers 100 are provided at positions that overlap the respective steered shaft supporting members 106 in the direction along the reference axial line 6A. The contact member 101 contacts a portion of the steered shaft 6 which is supported by the steered shaft supporting member 106. Therefore, the contact member 101 surely contacts the steered shaft 6. Also, a contact force with the steered shaft 6 can be excellently maintained. Accordingly, the effect of stopping movement of the steered shaft 6 in the rotation direction can be improved.

The steered shaft supporting member 106 is set so as to contact the steered shaft 6 in a state in which there is no external input to the steered shaft 6. That is, the steered shaft supporting member 106 of the present embodiment is not a steered shaft supporting member that supports the steered shaft 6 only when a predetermined-sized deformation or more occurs at the steered shaft 6. In the present embodiment, the steered shaft supporting member 106 is a steered shaft supporting member that is in contact with the steered shaft 6 even in a normal state. It is therefore possible to keep the supporting rigidity of the steered shaft 6 higher.

The steered shaft supporting member 106 is cylindrical in shape, and its inner peripheral surface is in contact with the outer peripheral surface of the steered shaft 6. The outer peripheral surface of the steered shaft 6 is supported by an inner peripheral surface of the steered shaft housing 7 through O-rings (elastic members) 107. That is, a supporting mechanism of the steered shaft 6 of the present embodiment has the O-rings (the elastic members) 107. Each O-ring 107 is provided between the steered shaft housing 7 and the steered shaft supporting member 106 in the radial direction with the reference axial line 6A being the center of the radial direction. Ring-shaped grooves 106E are formed on an outer peripheral surface of the steered shaft supporting member 106, and the O-rings 107 are set in the respective ring-shaped grooves 106B. The ring-shaped grooves 106B and the O-rings 107 are provided at two positions located at both sides of the steered shaft rotation stopper 100 in the direction along the reference axial line 6A. The steered shaft supporting member 106 has an opening 106A. The contact member 101 of the steered shaft rotation stopper 100 contacts the steered shaft 6 through this opening 106A.

The O-ring 107 forces the steered shaft supporting member 106 using its bounce force generated by compression of the O-ring 107 such that the steered shaft supporting member 106 is positioned at the center of the steered shaft housing 7. With this, the supporting rigidity of the steered shaft 6 can be further improved.

The steered shaft supporting member 106 further has a flange 106C that protrudes outwards in the radial direction with the reference axial line 6A being the center of the radial direction. The flange 106C is fitted into a ring-shaped recessed portion 7C formed on the inner peripheral surface of the steered shaft housing 7. With this structure, the steered shaft supporting member 106 is fixed such that a position of the steered shaft supporting member 106 in the direction along the reference axial line 6A is not changed during the movement of the steered shaft 6 in the longitudinal direction.

As explained above, the steered shaft rotation stopper 100 of the present embodiment is formed by the contact member 101, the forcing member 102 and the contact member retainer (the contact member retaining unit) 103. Then, the steered shaft rotation stopper 100 is provided at the steered shaft rotation stopper holder 7B.

The forcing member 102 is a member that forces the steered shaft 6 or the contact member 101 in a direction in which the steered shaft 6 and the contact member 101 push or press against each other. In the present embodiment, the forcing member 102 forces the contact member 101 toward the steered shaft 6. However, it is possible to force the steered shaft 6 toward the contact member 101 by the forcing member.

The contact member 101 is provided so as to be able to contact the contact portion 6D of the steered shaft 6. In a state in which the contact member 101 contacts the contact portion 6D, the contact member 101 stops (restrains) a rotation of the steered shaft 6 relative to the steered shaft housing 7 about the reference axial line 6A as an axis of the rotation.

In the case, like the present embodiment, where the steered shaft drive unit 8 is formed by the ball screw mechanism 8C, the ball screw mechanism 8C cannot stop (restrain) the movement of the steered shaft 6 in the rotation direction, i.e. the rotation of the steered shaft 6 relative to the steered shaft housing 7 about the reference axial line 6A as the axis of the rotation. However, by the structure in which the contact member 101 contacts the contact portion 6D of the steered shaft 6, the movement of the steered shaft 6 in the rotation direction can be stopped. Further, since the steered shaft 6 or the contact member 101 is forced in the direction in which the steered shaft 6 and the contact member 101 are pushed or pressed against each other by the forcing member 102, for instance, even when disturbance is inputted and wear occurs at the contact member 101 and/or the contact portion 6D, wobbly shakes (backlash) occurring between the contact portion 6D (the steered shaft 6) and the contact member 101 can be suppressed.

Modified Example 1

Figure 7A:
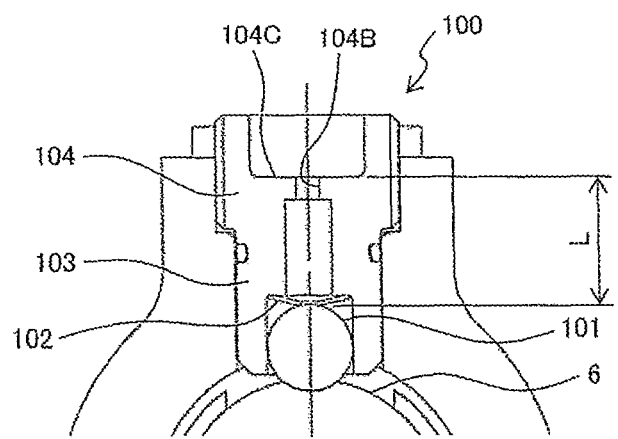
FIG. 7A is a drawing showing a modified example in which a part of a contact member retainer 103 and a part of a spring stroke adjuster 104 are modified.
Figure 7B:
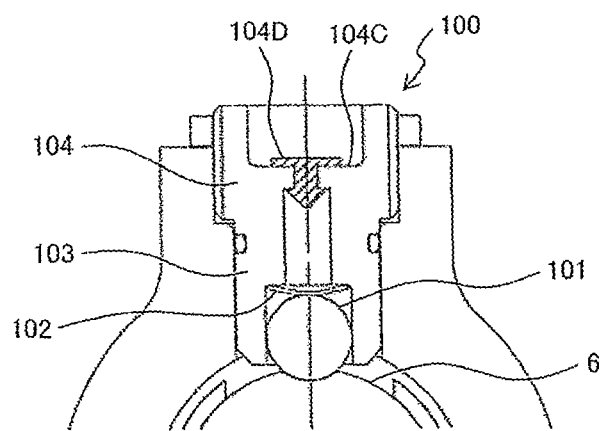
FIG. 7B is a sectional view showing a state in which a cap member 104D that closes a penetration hole 104B of the spring stroke adjuster 104 is provided.

A modified example 1 of the steered shaft rotation stopper will be explained with reference to FIGS. 7A and 7B. FIG. 7A is a drawing showing the modified example in which a part of the contact member retainer 103 and a part of the spring stroke adjuster 104 are modified. FIG. 7B is a sectional view showing a state in which a cap member 104D that closes a penetration hole 104B of the spring stroke adjuster 104 is provided.

In this modified example, the contact member retainer 103 and the spring stroke adjuster 104 has the penetration hole 104B that penetrates the contact member retainer 103 in the radial direction with the reference axial line 6A being the center of the radial direction. The penetration hole 104B is formed such that the stroke length of the forcing member 102 can be measured through the penetration hole 104B. The other structures are the same as those of the embodiment 1.

For instance, by measuring a distance L between the contact member 101 and an outer surface 104C of the spring stroke adjuster 104 with a gauge inserted into the penetration hole 104B and striking against the contact member 101, a set length of the forcing member 102, a length between the contact member 101 and the spring stroke adjuster 104 and the stroke length of the forcing member 102 can be measured.

Here, it is not necessary for the penetration hole 104B to be always open. After measuring the stroke length of the forcing member 102, the penetration hole 104B could be closed with the cap member 104O.

Modified Example 2

Figure 8:
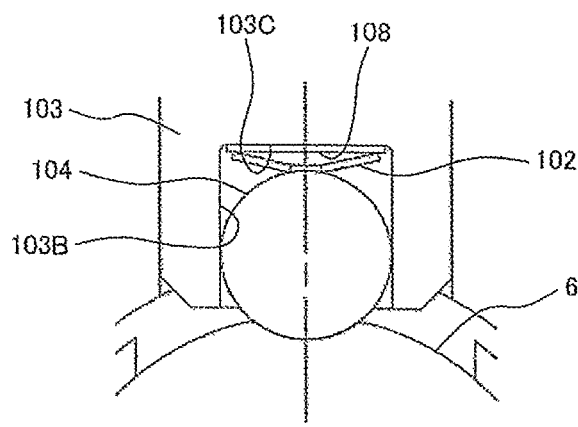
FIG. 8 is a sectional view showing a modified example in which a configuration of the forcing member 102 is modified.

A modified example 2 of the steered shaft rotation stopper will be explained with reference to FIG. 8. FIG. 8 is a sectional view showing the modified example in which a configuration of the forcing member 102 is modified.

In this modified example, a thrust bearing 108 is provided at a seat surface of the disc spring of the forcing member 102. The other structures are the same as those of the embodiment 1.

In this modified example, by adjusting a coefficient of friction of the thrust bearing 108, vibrations of the spring by a mass of the contact member 101 can be damped or diminished.

Modified Example 3

Figure 9:
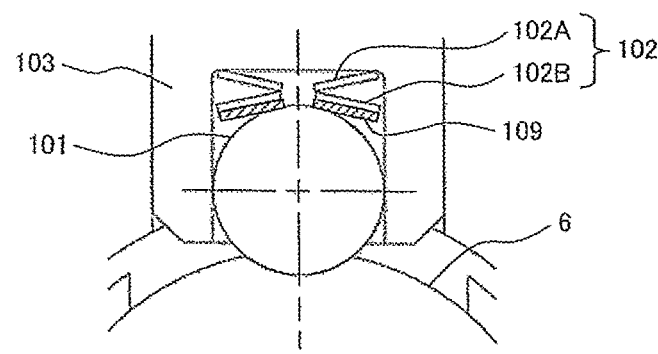
FIG. 9 is a sectional view showing a modified example in which a configuration of the forcing member 102 is modified.

A modified example 3 of the steered shaft rotation stopper will be explained with reference to FIG. 9. FIG. 9 is a sectional view showing the modified example in which a configuration of the forcing member 102 is modified.

In this modified example, the steered shaft rotation stopper 100 is provided with a low friction member 109. The low friction member 109 is interposed between the forcing member 102 and the contact member 101. The forcing member 102 is formed by a first disc spring 102A and a second disc spring 102B. These first and second disc springs 102A and 102B are stacked with their front and back sides being reversed. The second disc spring 102B serves to support the low friction member 109. In this case, a coefficient of friction of the low friction member 109 is smaller than those of the forcing member 102 and the contact member 101. The other structures are the same as those of the embodiment 1.

By interposing the low friction member 109 whose coefficient of friction is small between the forcing member 102 and the contact member 101, a sliding resistance of the contact member 101 by rotation of the contact member 101 can be reduced.

Modified Example 4

Figure 10:
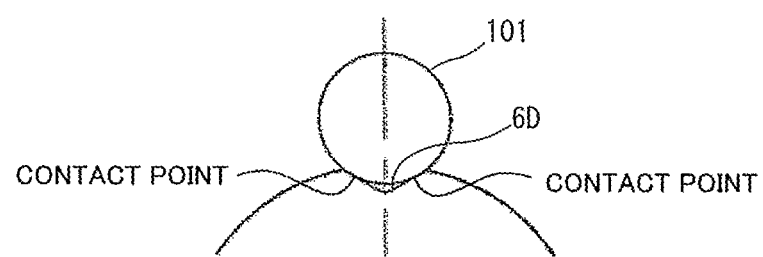
FIG. 10 is a sectional view showing a modified example in which a structure of the contact portion 6D of the steered shaft 6 is modified.

A modified example 4 of the steered shaft rotation stopper will be explained with reference to FIG. 10. FIG. 10 is a sectional view showing the modified example in which a structure of the contact portion 6D of the steered shaft 6 is modified.

In this modified example, when viewing the cross section of the contact portion 6D which is orthogonal to the reference axial line 6A, a groove shape of the contact portion 6D is like a V-shape rather than the arc shape. The contact member 101 therefore contacts the contact portion 6D at two separate points. The other structures are the same as those of the embodiment 1.

In the case of the contact portion 6D of this modified example, as compared with a three or more point contact or the arc-shaped surface contact between the contact portion 6D and the contact member 101, a force to stop the rotation of the steered shaft 6 easily works.

Modified Example 5

A modified example 5 of the steered shaft rotation stopper will be explained with reference to FIG. 11. FIG. 11 is a sectional view showing the modified example in which a structure of the contact member retainer 103 is modified.

In this modified example, the contact member retainer 103 of the steered shaft rotation stopper 100 is provided with a nail portion 103E. The nail portion 103E is formed at an opening of the hollow portion 103B where the contact member 101 is accommodated. By swaging or caulking the nail portion 103E, the contact member retainer 103 retains the contact member 101, and fall-off of the contact member 101 from the contact member retainer 103 is prevented. The other structures are the same as those of the embodiment 1.

In this case, it is preferable to form the contact member retainer 103 with metal material. By swaging or caulking the nail portion 103E with the contact member 101 accommodated in the contact member retainer 103, a structure in which the contact member 101 does not fall off from the contact member retainer 103 can be obtained. That is, even in a state in which the steered shaft rotation stopper 100 is removed from the steered shaft housing 7, a retaining state of the contact member 101 in the contact member retainer 103 can be maintained. It is therefore possible to suppress the fall-off of the contact member 101 during use.

Modified Example 6

A modified example 6 of the steered shaft rotation stopper will be explained with reference to FIG. 12. FIG. 12 is a drawing showing the modified example in which a part of a configuration of the steered shaft supporting member 106 is modified.

In this modified example, the steered shaft supporting member 106 is provided at the steered shaft accommodating section 7A without through the elastic members such as the O-rings 107 between the steered shaft supporting member 106 and the steered shaft accommodating section 7A. That is, the steered shaft supporting member 106 is set with its outer peripheral surface being able to be in contact with the inner peripheral surface of the steered shaft accommodating section 7A. The other structures are the same as those of the embodiment 1.

In the embodiment 1, the O-rings 107 forcing the steered shaft supporting member 106 toward the center of the steered shaft housing 7 are provided. In contrast to this, in this modified example, since no elastic member (no forcing member) such as the O-ring 107 is used, increase in the number of parts count can be suppressed. Since the steered shaft 6 is forced by the steered shaft rotation stopper 100, the steered shaft 6 is supported by the steered shaft rotation stopper 100 and the steered shaft supporting member 106, then a required supporting rigidity of the steered shaft 6 can be obtained.

Modified Example 7

Figure 13:
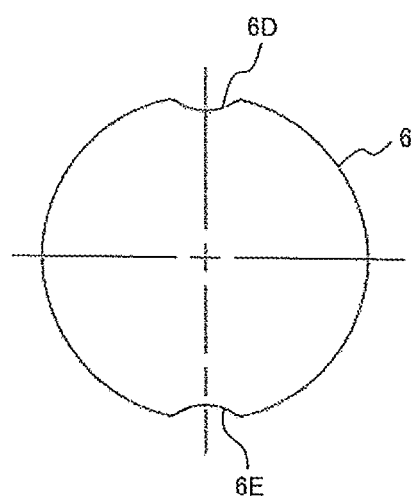
FIG. 13 is a sectional view showing a modified example in which a structure of the steered shaft 6 is modified.

A modified example 7 of the steered shaft rotation stopper will be explained with reference to FIG. 13. FIG. 13 is a sectional view showing the modified example in which a structure of the steered shaft 6 is modified.

In this modified example, the steered shaft 6 has a first concave or depressed shape that forms the contact portion 6D and also a second concave or depressed shape. When viewing a cross section of the steered shaft 6 which is orthogonal to the reference axial line 6A, the second concave shape is located at an opposite side to the contact portion 6D with respect to the reference axial line 6A. The second concave shape opens outwards in the radial direction with the reference axial line 6A being the center of the radial direction. The other structures are the same as those of the embodiment 1.

By forming a second concave portion 6E at a position symmetrical to a concave portion forming the contact portion 6D, the steered shaft 6 has a well-balanced cross section. This can suppress an occurrence of bending of the steered shaft 6 during heat treatment after machining of the steered shaft 6.

Modified Example 8

Figure 14:
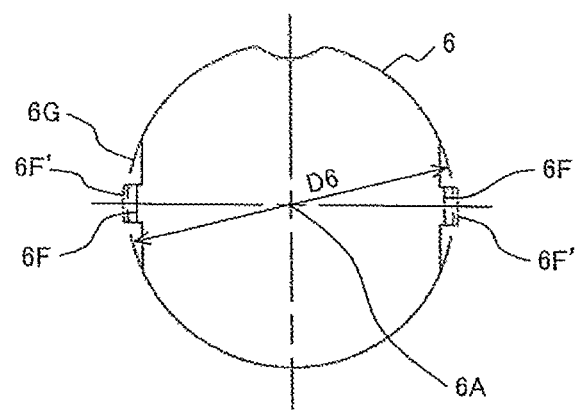
FIG. 14 is a sectional view showing a modified example in which a structure of the steered shaft 6 is modified.
Figure 15:
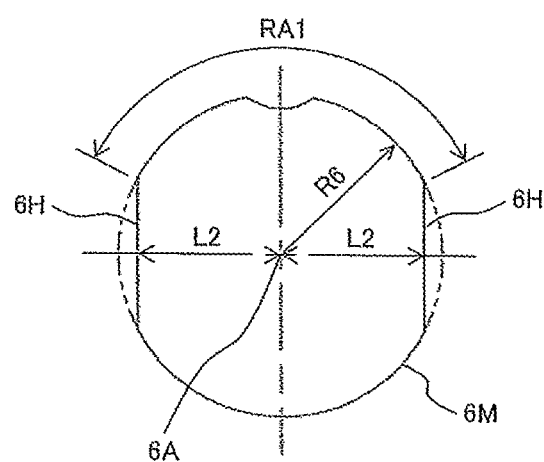
FIG. 15 is a sectional view showing a modified example in which a component(s) of material 6M of the steered shaft 6 is modified.

A modified example 8 of the steered shaft rotation stopper will be explained with reference to FIGS. 14 and 15. FIG. 14 is a sectional view showing the modified example in which a structure of the steered shaft 6 is modified. FIG. 15 is a sectional view showing the modified example in which a component(s) of material 6M of the steered shaft 6 is modified.

In this modified example, the steered shaft supporting member 106 is provided at the steered shaft accommodating section 7A of the steered shaft housing 7, and supports the steered shaft 6. The contact portion 6D is formed by forging material 6M that forms the steered shaft 6. The steered shaft 6 has burrs that occur by forging the material 6M and forming the contact portion 6D. The steered shaft 6 is formed such that when viewing its cross section orthogonal to the reference axial line GA, a diameter D6 of a minimum imaginary circle 6G that can encircle the steered shaft 6 including the burrs occurring at the forming of the contact portion 6D is smaller than a diameter D106 (see FIG. 4A) of an inner peripheral edge of the steered shaft supporting member 106. The other structures are the same as those of the embodiment 1.

In this modified example, when forming a concave contact portion at circular cross section material, remaining material of the concave portion protrudes outwards in the radial direction as a burr 6F. If this burr 6F excessively protrudes outwards, there is a risk that the burr 6F will interfere with the steered shaft supporting member 106. However, by forming and setting the steered shaft 6 and the steered shaft supporting member 106 such that the minimum imaginary circle 6G that can encircle the steered shaft 6 including the burrs 6F is put in the steered shaft supporting member 106, the burrs 6F does not need removing, and workability and productivity can be improved. That is, if the burr, like a burr 6F', excessively protrudes outwards, the diameter D6 of the imaginary circle 6G that can encircle the steered shaft 6 including the burrs 6F' becomes large. At this time, if the diameter. D6 is greater than the diameter D106 of the inner peripheral edge of the steered shaft supporting member 106, removal work or machining of the burrs 6F' is required.

In this modified example, in order for the imaginary circle 6G to be put in the steered shaft supporting member 106, a pair of flat surface portions 6H are formed at the material 6M forming the steered shaft 6. That is, the material 6M forming the steered shaft 6 has a cross section orthogonal to the reference axial line 6A such that a predetermined section including the contact portion 6D has an arc shape having a first radius of curvature R6 with the reference axial line 6A being a center. The material 6M forming the steered shaft 6 further has, at sections where the burrs 6F (see FIG. 14) occur, the pair of flat surface portions 6H, each distance L2 from the reference axial line 6A of which is smaller than the first radius of curvature R6.

By forming the pair of flat surface portions 6H and allowing the burrs 6F to occur at these flat surface portions 6H, even after the burrs 6F occur, the minimum imaginary circle 6G (see FIG. 14) that can encircle the steered shaft 6 including the burrs 6F can be put in the steered shaft supporting member 106.

Modified Example 9

Figure 16:
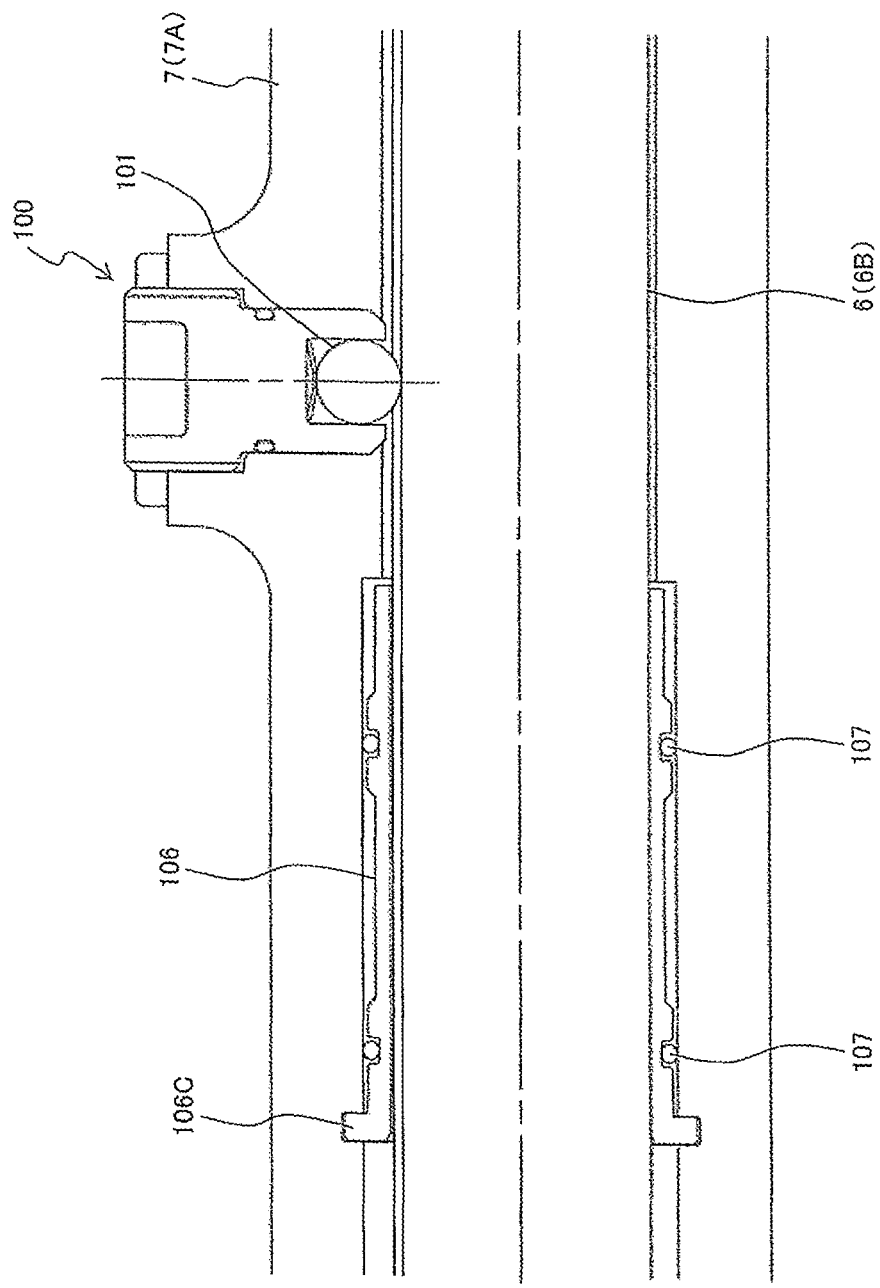
FIG. 16 is a sectional view showing a modified example in which a position relationship between a steered shaft rotation stopper 100 and the steered shaft supporting member 106 is modified.

A modified example 9 of the steered shaft rotation stopper will be explained with reference to FIG. 16. FIG. 16 is a sectional view showing the modified example in which a position relationship between the steered shaft rotation stopper 100 and the steered shaft supporting member 106 is modified.

In this modified example, the steered shaft rotation stopper 100 is provided at a position that does not overlap the steered shaft supporting member 106 in the direction along the reference axial line 6A. That is, the steered shaft rotation stopper 100 is provided at a position that is separate from the steered shaft supporting member 106 in the direction along the reference axial line 6A. The other structures are the same as those of the embodiment 1.

Since the steered shaft rotation stopper 100 and the steered shaft supporting member 106 are provided at positions where the steered shaft rotation stopper 100 and the steered shaft supporting member 106 do not overlap each other, the steered shaft rotation stopper 100 and the steered shaft supporting member 106 can be individually fixed to the steered shaft housing 7. With this, efficiency in assembly of the steering device 1 can be improved.

Modified Example 10

Figure 17:
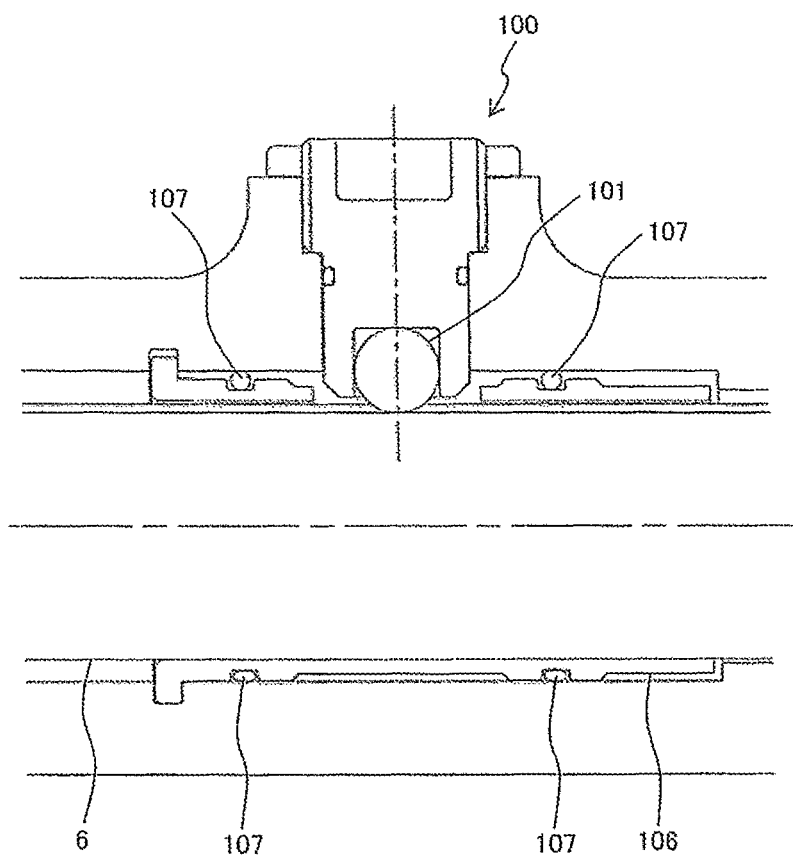
FIG. 17 is a sectional view showing a modified example in which a forcing configuration between the contact member 101 and the steered shaft 6 is modified.

A modified example 10 of the steered shaft rotation stopper will be explained with reference to FIG. 17. FIG. 17 is a sectional view showing the modified example in which a forcing configuration between the contact member 101 and the steered shaft 6 is modified.

In this modified example, the steered shaft supporting member 106 is provided at the steered shaft accommodating section 7A of the steered shaft housing 7, and supports the steered shaft 6. The forcing member 102 is provided between the steered shaft housing 7 and the steered shaft supporting member 106 in the radial direction with the reference axial line 6A being the center of the radial direction. In this modified example, the forcing member 102 is formed by the O-rings 107. In this case, when viewing the cross section orthogonal to the reference axial line 6A, the forcing member 102 is provided at an opposite side to the contact member 101 with respect to the reference axial line 6A.

In the embodiment 1, the forcing member 102 is accommodated in the hollow portion 103B such that the forcing member 102 is interposed between the contact member retainer 103 and the contact member 101, and forces the contact member 101 so as to push or press the contact member 101 against the steered shaft 6. In contrast to this, in this modified example, a radial direction position of the contact member 101 with the reference axial line 6A being the center of the radial direction is fixed. That is, the forcing member 102 is not provided between the contact member retainer 103 and the contact member 101. In this case, the contact member 101 is configured to push or press the steered shaft 6 toward an opposite side to a side where the contact member 101 is provided. The steered shaft 6 pushed or pressed by the contact member 101 presses or squeezes the O-rings 107 located at the opposite side to the side where the contact member 101 is provided, then the steered shaft 6 is forced toward the contact member 101 by reaction forces of the squeezed O-rings 107. The other structures are the same as those of the embodiment 1.

By forcing the steered shaft 6 toward the contact member 101 through the steered shaft supporting member 106, wobbly shakes (backlash) occurring between the steered shaft 6 and the contact member 101 can be suppressed. Further, no special forcing member is required for forcing the contact member 101.

Here, even in the case where the forcing member 102 is provided such that the forcing member 102 is interposed between the contact member retainer 103 and the contact member 101, the steered shaft 6 is forced toward the contact member 101 by the O-rings 107. Because of this, it is preferable that the contact member 101 and the steered shaft 6 should be pushed or pressed against each other with a balance between an urging force by the forcing member 102 provided so as to be interposed between the contact member retainer 103 and the contact member 101 and an urging force by the O-rings 107 being maintained.

Modified Example 11

Figure 18:
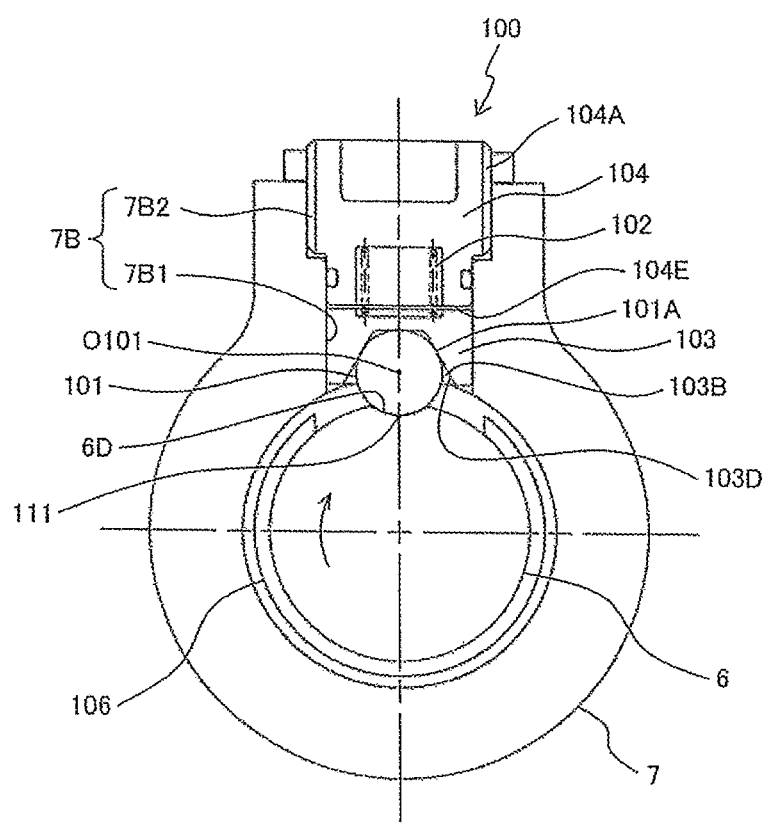
FIG. 18 is a sectional view showing a modified example in which a configuration of the contact member retainer 103 is modified.

A modified example 11 of the steered shaft rotation stopper will be explained with reference to FIG. 18. FIG. 18 is a sectional view showing the modified example in which a configuration of the contact member retainer 103 is modified.

In this modified example, the spring stroke adjuster 104 and the contact member retainer 103 are formed as different members. The screw thread (the male thread) 104A of the spring stroke adjuster 104 is fitted to (or screwed into) the screw thread (the female thread) 7B2 formed at the steered shaft rotation stopper holder 7B, then the spring stroke adjuster 104 is fixed such that its position at the steered shaft rotation stopper holder 7B can be changed. On the other hand, the contact member retainer 103 is movably provided so as to be able to get closer to and separate from the steered shaft 6 at the cylindrical surface 7B1 of the steered shaft rotation stopper holder 7B. The forcing member 102 is provided between the spring stroke adjuster 104 and the contact member retainer 103. The forcing member 102 forces the contact member retainer 103 toward the steered shaft 6.

The spring stroke adjuster 104 has a stopper portion 104E. The stopper portion 104E contacts a movable body including the contact member 101 (in this example, the movable body includes the contact member 101 and the contact member retainer 103) with the forcing member 102 being compressed. Therefore, a movement of the contact member 101 in a radial direction moving away from the contact portion 6D with the reference axial line 6A being the center of the radial direction is stopped (restrained).

When such a heavy load as the forcing member 102 cannot completely withstand by an urging force of the forcing member 102 is inputted to the contact member 101 from the steered shaft 6, the contact member 101 (the contact member retainer 103) contacts the stopper portion 104E, then the radial movement of the contact member 101 in the direction moving away from the contact portion 6D is restrained. It is therefore possible to maintain a contact state of the contact member 101 with the contact portion 6D. Hence, a restraining state in which the rotational movement of the steered shaft 6 is stopped can be maintained.

Further, in this modified example, an inner side surface of the hollow portion 103B of the contact member retainer 103 accommodating therein the contact member 101 is formed as a tapered surface 103D. The contact member retainer 103 is located between the forcing member 102 and the contact member 101. The contact member retainer 103 has a reaction force receiving portion 101A that contacts the contact member 101 at a position opposite to a pair of contact points 111 of the contact portion 6D and the contact member 101 with respect to a center point O101 of the contact member 101. That is, when the steered shaft 6 attempts to rotate in a direction of an arrow shown in the drawing, the reaction force receiving portion 101A is formed at the tapered surface 103D, and stops the rotation of the steered shaft 6.

The contact member retainer 103 can properly receive the reaction force from the contact member 101 at the reaction force receiving portion 101A when stopping the rotation of the steered shaft 6.

The other structures are the same as those of the embodiment 1.

Modified Example 12

Figure 19:
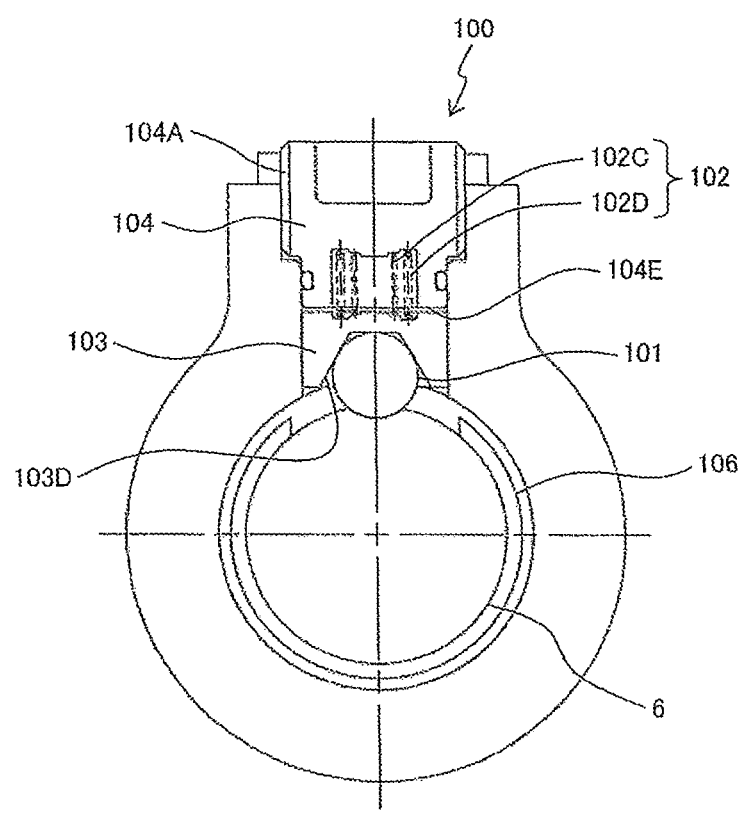
FIG. 19 is a sectional view showing a modified example in which a configuration of the forcing member 102 is modified from the modified example 11.

A modified example 12 of the steered shaft rotation stopper will be explained with reference to FIG. 19. FIG. 19 is a sectional view showing the modified example in which a configuration of the forcing member 102 is modified from the modified example 11.

In this modified example, a configuration of the forcing member 102 is different from that of the modified example 11. In this modified example, two coil springs whose spring constants are different from each other are arranged parallel to each other between the spring stroke adjuster 104 and the contact member 101 (including the contact member retainer 103).

In this modified example, the two coil springs whose spring constants are different can suppress resonance when vibrations by a mass of the contact member 101 occur.

The present invention is not limited to the above embodiment and modified examples, and a structure or configuration can be partly removed, also other structures or configurations which are not described in the above explanation could be added to the present invention. A structure or configuration of the embodiment and modified examples could be combined with that of the other embodiment and modified examples as long as a contradiction does not arise. Effects obtained by the combination of the structure or configuration of the embodiment and modified examples with that of the other embodiment and modified examples are also achieved by the other embodiment and modified examples. A combination of a plurality of modified examples 1 to 12 could be applied to the embodiment 1.

As a steering device based on the above embodiment and modified examples, for instance, the followings are raised.

As one aspect of the present invention, a steering device comprises: a steered shaft housing having a steered shaft accommodating section and a steered shaft rotation stopper holder, wherein the steered shaft accommodating section has a tubular shape; a steered shaft having a steered shaft main body and a contact portion, wherein at least a part of the steered shaft is accommodated in the steered shaft accommodating section, the steered shaft main body has a rod-shape, and the contact portion is provided at an outer peripheral side of the steered shaft main body; an actuator that can move the steered shaft with respect to the steered shaft housing in a longitudinal direction of the steered shaft; and a steered shaft rotation stopper having a contact member and a forcing member, wherein the contact member and the forcing member are provided at the steered shaft rotation stopper holder, and wherein when defining an axial line that passes through a center of the steered shaft main body on a cross section orthogonal to the longitudinal direction of the steered shaft and that is parallel to the longitudinal direction of the steered shaft as a reference axial line, the forcing member forces at least either one of the steered shaft or the contact member in a direction in which the steered shaft and the contact member push against each other, and the contact member is provided so as to be able to contact the contact portion, and in a state in which the contact member contacts the contact portion, the contact member stops a rotation of the steered shaft relative to the steered shaft housing about the reference axial line as an axis of the rotation.

As a preferable steering device, the forcing member is a spring.

As a far preferable steering device, the forcing member is a disc spring.

As a far preferable steering device, the contact member and the contact portion are set so as to overlap each other in a radial direction with the reference axial line being a center of the radial direction such that their overlap amount is greater than a stroke length from compression to expansion of the forcing member.

As a far preferable steering device, the steered shaft rotation stopper has a spring stroke adjuster, and the spring stroke adjuster is provided at the steered shaft housing such that the forcing member is located between the spring stroke adjuster and the contact member in the radial direction with the reference axial line being the center of the radial direction and such that a relative position of the spring stroke adjuster with respect to the steered shaft housing can be changed in the radial direction with the reference axial line being the center of the radial direction.

As a far preferable steering device, the spring stroke adjuster has a stopper portion, and the stopper portion contacts a movable body including the contact member with the forcing member being compressed, and stops a movement of the contact member in a radial direction moving away from the contact portion with the reference axial line being the center of the radial direction.

As a far preferable steering device, the spring stroke adjuster has a penetration hole that penetrates the steered shaft rotation stopper in the radial direction with the reference axial line being the center of the radial direction, and the penetration hole is formed such that the stroke length of the forcing member can be measured through the penetration hole.

As a far preferable steering device, the steering device further comprises a steered shaft supporting member provided at the steered shaft accommodating section and structured to be able to support the steered shaft.

As a far preferable steering device, the steered shaft supporting member is set so as to contact the steered shaft in a state in which there is no external input to the steered shaft.

As a far preferable steering device, the steering device further comprises an O-ring provided between the steered shaft housing and the steered shaft supporting member in the radial direction with the reference axial line being the center of the radial direction.

As a far preferable steering device, the steered shaft supporting member is provided at the steered shaft accommodating section without through an elastic member between the steered shaft supporting member and the steered shaft accommodating section.

As a far preferable steering device, the steered shaft rotation stopper is provided at a position that overlaps the steered shaft supporting member in a direction along the reference axial line.

As a far preferable steering device, the steered shaft rotation stopper is provided at a position that does not overlap the steered shaft supporting member in the direction along the reference axial line.

As a far preferable steering device, the contact member is provided such that the contact member can rotate with respect to the steered shaft.

As a far preferable steering device, the steered shaft rotation stopper has, between the forcing member and the contact member, a low friction member whose coefficient of friction is smaller than those of the forcing member and the contact member.

As a far preferable steering device, the contact portion has a first depressed shape that opens outwards in a radial direction with the reference axial line being a center of the radial direction, the first depressed shape is formed so as to extend along a direction of the reference axial line, and the contact member is formed into a spherical shape such that the contact member can rotate on the steered shaft.

As a far preferable steering device, the contact member contacts the contact portion at two points.

As a far preferable steering device, the steered shaft rotation stopper has a contact member retainer, and the contact member retainer is located between the forcing member and the contact member, and has a reaction force receiving portion that contacts the contact member at a position opposite to a pair of contact points of the contact portion and the contact member with respect to a center point of the contact member.

As a far preferable steering device, the steered shaft rotation stopper has a contact member retainer, and the contact member retainer has a nail portion that prevents fall-off of the contact member from the contact member retainer in a state in which the contact member retainer retains the contact member.

As a far preferable steering device, the steering device further comprises a steered shaft supporting member provided at the steered shaft accommodating section and structured to be able to support the steered shaft, and wherein the steered shaft has burrs that occur by forging material of the steered shaft and forming the contact portion, and the steered shaft is formed such that when viewing a cross section of the steered shaft which is orthogonal to the reference axial line, a diameter of a minimum imaginary circle that can encircle the steered shaft including the burrs is smaller than a diameter of an inner peripheral edge of the steered shaft supporting member.

As a far preferable steering device, the material forming the steered shaft has a cross section orthogonal to the reference axial line such that a predetermined section including the contact portion has an arc shape having a first radius of curvature with the reference axial line being a center, and the material further has, at sections where the burrs occur, a pair of flat surface portions, each distance from the reference axial line of which is smaller than the first radius of curvature.

As a far preferable steering device, the steered shaft has a second depressed shape, when viewing a cross section of the steered shaft which is orthogonal to the reference axial line, the second depressed shape is located at an opposite side to the contact portion with respect to the reference axial line, and the second depressed shape has a depressed shape that opens outwards in the radial direction with the reference axial line being the center of the radial direction.

As a far preferable steering device, the steering device further comprises a steered shaft supporting member provided at the steered shaft accommodating section and structured to be able to support the steered shaft, and wherein the forcing member is provided between the steered shaft housing and the steered shaft supporting member in a radial direction with the reference axial line being a center of the radial direction, and located at an opposite side to the contact member with respect to the reference axial line when viewing a cross section orthogonal to the reference axial line.

As a far preferable steering device, the contact member is provided, in the steered shaft housing with the contact member not being in contact with the steered shaft housing.

As a far preferable steering device, the forcing member is a coil spring formed by a variable pitch spring.

As a far preferable steering device, the spring is formed by parallel-arranged two coil springs whose spring constants are different from each other.

As a far preferable steering device, the steering device further comprises a thrust bearing provided at a seat surface of the disc spring.

The invention claimed is:

1. A steering device comprising:
a steered shaft housing having a steered shaft accommodating section and a steered shaft rotation stopper holder, wherein the steered shaft accommodating section has a tubular shape;
a steered shaft having a steered shaft main body and a contact portion, wherein at least a part of the steered shaft is accommodated in the steered shaft accommodating section, the steered shaft main body has a rod-shape, and the contact portion is provided at an outer peripheral side of the steered shaft main body;
an actuator structured to move the steered shaft with respect to the steered shaft housing in a longitudinal direction of the steered shaft; and
a steered shaft rotation stopper having a contact member and a forcing member, wherein the contact member and the forcing member are provided at the steered shaft rotation stopper holder, and wherein
when defining an axial line that passes through a center of the steered shaft main body on a cross section orthogonal to the longitudinal direction of the steered shaft and that is parallel to the longitudinal direction of the steered shaft as a reference axial line,
the forcing member forces at least either one of the steered shaft or the contact member in a direction in which the steered shaft and the contact member push against each other, and
the contact member is provided so as to be able to contact the contact portion, and in a state in which the contact member contacts the contact portion, the contact member stops a rotation of the steered shaft relative to the steered shaft housing about the reference axial line as an axis of the rotation,
wherein the forcing member is a spring, and
wherein the contact member and the contact portion are set so as to overlap each other in a radial direction with the reference axial line being a center of the radial direction such that their overlap amount is greater than a stroke length from compression to expansion of the forcing member.

2. The steering device as claimed in claim 1, wherein:
the spring is a disc spring.

3. The steering device as claimed in claim 1, wherein:
the steered shaft rotation stopper has a spring stroke adjuster, and
the spring stroke adjuster is provided at the steered shaft housing such that the forcing member is located between the spring stroke adjuster and the contact member in the radial direction with the reference axial line being the center of the radial direction and such that a relative position of the spring stroke adjuster with respect to the steered shaft housing is changeable in the radial direction with the reference axial line being the center of the radial direction.

4. The steering device as claimed in claim 2, wherein:
the spring stroke adjuster has a stopper portion, and
the stopper portion contacts a movable body including the contact member with the forcing member being compressed, and stops a movement of the contact member in a radial direction moving away from the contact portion with the reference axial line being the center of the radial direction.

5. The steering device as claimed in claim 2, wherein:
the spring stroke adjuster has a penetration hole that penetrates the steered shaft rotation stopper in the radial direction with the reference axial line being the center of the radial direction, and
the penetration hole is formed such that the stroke length of the forcing member is measurable through the penetration hole.

6. The steering device as claimed in claim 1, further comprising:
a steered shaft supporting member provided at the steered shaft accommodating section and structured to be able to support the steered shaft.

7. The steering device as claimed in claim 6, wherein:
the steered shaft supporting member is set so as to contact the steered shaft in a state in which there is no external input to the steered shaft.

8. The steering device as claimed in claim 7, further comprising:
an O-ring provided between the steered shaft housing and the steered shaft supporting member in the radial direction with the reference axial line being the center of the radial direction.

9. The steering device as claimed in claim 6, wherein:
the steered shaft supporting member is provided at the steered shaft accommodating section without an elastic member between the steered shaft supporting member and the steered shaft accommodating section.

10. The steering device as claimed in claim 6, wherein:
the steered shaft rotation stopper is provided at a position that overlaps the steered shaft supporting member in a direction along the reference axial line.

11. The steering device as claimed in claim 6, wherein:
the steered shaft rotation stopper is provided at a position that does not overlap the steered shaft supporting member in the direction along the reference axial line.

12. A steering device comprising:
a steered shaft housing having a steered shaft accommodating section and a steered shaft rotation stopper holder, wherein the steered shaft accommodating section has a tubular shape;
a steered shaft having a steered shaft main body and a contact portion, wherein at least a part of the steered shaft is accommodated in the steered shaft accommodating section, the steered shaft main body has a rod-shape, and the contact portion is provided at an outer peripheral side of the steered shaft main body;
an actuator configured to move the steered shaft with respect to the steered shaft housing in a longitudinal direction of the steered shaft; and
a steered shaft rotation stopper having a contact member and a forcing member, wherein the contact member and the forcing member are provided at the steered shaft rotation stopper holder, and wherein
when defining an axial line that passes through a center of the steered shaft main body on a cross section orthogonal to the longitudinal direction of the steered shaft and that is parallel to the longitudinal direction of the steered shaft as a reference axial line,
the forcing member forces at least either one of the steered shaft or the contact member in a direction in which the steered shaft and the contact member push against each other, and
the contact member is provided so as to be able to contact the contact portion, and in a state in which the contact member contacts the contact portion, the contact member stops a rotation of the steered shaft relative to the steered shaft housing about the reference axial line as an axis of the rotation,
wherein the contact member is provided such that the contact member is rotatable with respect to the steered shaft, and
wherein the steered shaft rotation stopper has, between the forcing member and the contact member, a low friction member whose coefficient of friction is smaller than those of the forcing member and the contact member.

13. The steering device as claimed in claim 12, wherein:
the contact portion has a first depressed shape that opens outwards in a radial direction with the reference axial line being a center of the radial direction,
the first depressed shape is formed so as to extend along a direction of the reference axial line, and
the contact member is formed into a spherical shape such that the contact member is rotatable on the steered shaft.

14. The steering device as claimed in claim 13, wherein:
the contact member contacts the contact portion at two points.

15. The steering device as claimed in claim 14, wherein:
the steered shaft rotation stopper has a contact member retainer, and
the contact member retainer is located between the forcing member and the contact member, and has a reaction force receiving portion that contacts the contact member at a position opposite to a pair of contact points of the contact portion and the contact member with respect to a center point of the contact member.

16. The steering device as claimed in claim 13, wherein:
the steered shaft rotation stopper has a contact member retainer, and the contact member retainer has a nail portion that prevents fall-off of the contact member from the contact member retainer in a state in which the contact member retainer retains the contact member.

17. The steering device as claimed in claim 13, further comprising:
a steered shaft supporting member provided at the steered shaft accommodating section and structured to be able to support the steered shaft, and wherein
the steered shaft has burrs that occur by forging material of the steered shaft and forming the contact portion, and
the steered shaft is formed such that when viewing a cross section of the steered shaft which is orthogonal to the reference axial line, a diameter of a minimum imaginary circle that can encircle the steered shaft including the burrs is smaller than a diameter of an inner peripheral edge of the steered shaft supporting member.

18. The steering device as claimed in claim 17, wherein:
the material forming the steered shaft has a cross section orthogonal to the reference axial line such that a predetermined section including the contact portion has an arc shape having a first radius of curvature with the reference axial line being a center, and the material further has, at sections where the burrs occur, a pair of flat surface portions, each distance from the reference axial line of which is smaller than the first radius of curvature.

19. The steering device as claimed in claim 13, wherein:
the steered shaft has a second depressed shape,
when viewing a cross section of the steered shaft which is orthogonal to the reference axial line, the second depressed shape is located at an opposite side to the contact portion with respect to the reference axial line, and
the second depressed shape has a depressed shape that opens outwards in the radial direction with the reference axial line being the center of the radial direction.

20. The steering device as claimed in claim 1, further comprising:
a steered shaft supporting member provided at the steered shaft accommodating section and structured to be able to support the steered shaft, and wherein
the forcing member is provided between the steered shaft housing and the steered shaft supporting member in a radial direction with the reference axial line being a center of the radial direction, and located at an opposite side to the contact member with respect to the reference axial line when viewing a cross section orthogonal to the reference axial line.

21. The steering device as claimed in claim 1, wherein:
the contact member is provided in the steered shaft housing with the contact member not being in contact with the steered shaft housing.

22. The steering device as claimed in claim 1, wherein:
the spring is a coil spring formed by a variable pitch spring.

23. The steering device as claimed in claim 1, wherein:
the spring is formed by parallel-arranged two coil springs whose spring constants are different from each other.

24. The steering device as claimed in claim 2, further comprising:
a thrust bearing provided at a seat surface of the disc spring.

* * * * *